(12) United States Patent
Grant et al.

(10) Patent No.: US 7,397,843 B2
(45) Date of Patent: Jul. 8, 2008

(54) REDUCED COMPLEXITY SOFT VALUE GENERATION FOR MULTIPLE-INPUT MULTIPLE-OUTPUT (MIMO) JOINT DETECTION GENERALIZED RAKE (JD-GRAKE) RECEIVERS

(75) Inventors: Stephen Grant, Cary, NC (US); Karl Molnar, Cary, NC (US)

(73) Assignee: Telefonaktiebolaget L L M Ericsson (Publ), Stockholm (SE)

( * ) Notice: Subject to any disclaimer, the term of this patent is extended or adjusted under 35 U.S.C. 154(b) by 742 days.

(21) Appl. No.: 10/911,969

(22) Filed: Aug. 4, 2004

(65) Prior Publication Data

US 2006/0029124 A1    Feb. 9, 2006

(51) Int. Cl.
*H04B 1/00* (2006.01)
(52) U.S. Cl. ............... 375/148; 375/267; 375/150; 375/345; 455/101
(58) Field of Classification Search ........... 375/148, 375/150, 267, 347; 455/101
See application file for complete search history.

(56) References Cited

U.S. PATENT DOCUMENTS 5,787,131 A * 7/1998 Bottomley ............ 375/347
5,790,606 A    8/1998 Dent
6,148,041 A   11/2000 Dent

OTHER PUBLICATIONS

Boutros, Gresset, Brunel, Fossorier; Soft-input soft-output lattice sphere decoder for linear channels; Jun. 2003.

Jong, Willink, Interative Tree Search Detection for MIMO Wireless Systems; Jan. 2002.

Hicks, Bayram, Tranter, Boyle, Reed; Overload Array Processing With Spatially Reduced Search Joint Detection; Aug. 2001; IEEE Journal On Selected Areas In Communications, vol. 19, No. 8; pp. 1584-1593.

Klein, Kaleh, Baier; Zero Forcing and Minimum Mean-Square-Error Equalization for Multiuser Detection in Code-Division Multiple-Acess Channels; May 1996; IEEE Transactions On Vehicular Technology, vol. 45, No. 2; pp. 276-287.

Hochwald, Brink; Achieving Near-Capacity on a Multiple-Antenna Channel; Mar. 2003; IEEE Transactions On Communications, vol. 51, No. 3; pp. 389-399.

Bottomley, Ottosson, Wang; A Generalized RAKE Receiver for Interference Suppression; Aug. 2000; IEEE Journal On Selected Areas In Communications, vol. 18, No. 8; pp. 1536-1545.

Grant, Molnar, Bottomley; Generalized RAKE Receivers for MIMO Systems; Jan. 2003.

Foschini, Golden; Valenzuela, Wolniansky; Simplified Processing for High Spectral Efficiency Wireless Communication Employing Multi-Element Arrays; Nov. 1999; IEEE Jornal On Selected Areas in Communications, vol. 17, No. 11; pp. 1841-1852.

(Continued)

*Primary Examiner*—Mohammad Ghayour
*Assistant Examiner*—Juan A. Torres
(74) *Attorney, Agent, or Firm*—Roger S. Burleigh

(57) ABSTRACT

A receiver includes a receiver circuit that decodes multiple signals of interest contained in a composite receive signal. The receiver comprises at least one Generalized RAKE combining circuit and a joint demodulation circuit and generates a detected signal at an output. The joint demodulation circuit contains a reduced search soft value generator circuit and generates soft bit values that represent coded bits received from the transmitter.

26 Claims, 3 Drawing Sheets

OTHER PUBLICATIONS

Chung, Lozano, Huang; Approaching Eigenmode BLAST Channel Capacity Using V-BLAST with Rate and Power Feedback; Aug. 2001.

Viterbo, Boutros; A Universal Lattice Code Decoder for Fading Channels; Jul. 1999; IEEE Transactions on Information Theory, vol. 45, No. 5, pp. 1639-1642.

* cited by examiner

US 7,397,843 B2

REDUCED COMPLEXITY SOFT VALUE GENERATION FOR MULTIPLE-INPUT MULTIPLE-OUTPUT (MIMO) JOINT DETECTION GENERALIZED RAKE (JD-GRAKE) RECEIVERS

BACKGROUND OF THE INVENTION

1. Field of the Invention

The present invention relates in general to the wireless telecommunications field and, in particular, to a mobile terminal containing a joint detection generalized RAKE (JD-GRAKE) receiver that utilizes a cumulative metric across the transmitting antennas which enables a reduced complexity tree search technique to be used to determine soft bit values that represent coded bits received from transmit antennas in a base station.

2. Description of Related Art

Today there is a very high level of interest in developing ways of enhancing data rates in multiple-input, multiple-output (MIMO) antenna architectures that are used in mobile communication systems which implement the high-speed-downlink-packet access (HSDPA) provision of the wideband code-division multiple-access (WCDMA) standard. For example, code-reuse (CR)-BLAST (similar to V-BLAST) and per-antenna rate-control (PARC) are two such techniques that can be used to enhance data rates in MIMO antenna systems. These two techniques are described in detail in the following two articles:

G. Foschini et al. "Simplified Processing for High Spectral Efficiency Wireless Communication Employing Multi-Element Arrays," IEEE Journal on Selected Areas of Communications, vol. 17, pp. 1841-1852, November 1999.

S. T. Chung et al. "Approaching Eigenmode BLAST Channel Capacity Using V-BLAST with Rate and Power Feedback" Proc. IEEE VTC'02-Fall, Atlantic City, N.J., October 2001.

The CR-BLAST and PARC techniques, as applied to the HSDPA system, both employ multi-code transmission to exploit the large capacity of the MIMO channel and thus deliver very high data rates to the mobile terminals. CR-BLAST is a spatial multiplexing technique, meaning one coded bit stream is interleaved over all transmit antennas, while PARC transmits a separately coded bit stream from each transmit antenna. Initially, the design of receivers for MIMO systems that employ such techniques often focused on the case of flat fading channels. In reality, however, the channel is often dispersive, thus causing multiple access interference (MAI) and inter-symbol interference (ISI). In addition, self-interference occurs, even in flat fading channels, since the multi-codes used in HSDPA are reused across the transmit antennas so as to avoid a code limitation problem.

Since the memory and/or processing power of mobile terminals is typically quite limited, the challenge in receiver design for the dispersive MIMO scenario is to achieve a good balance between performance and complexity in a receiver. This is especially true since the number of signals the receiver needs to demodulate is large due to multi-code and multi-antenna transmission. On one extreme of the complexity scale is the conventional RAKE receiver that performs poorly since RAKE is designed for white noise, and the ISI and MAI is colored. Moreover, the conventional RAKE receiver fails due to self-interference from code reuse. The other extreme is occupied by full joint-demodulation receivers, which perform very well, but are extremely complex. Somewhere in the middle, for example, are receivers like minimum-mean-squared (MMSE)-GRAKE receivers that employ some form of either linear or decision feedback equalization. A detailed description about the MMSE-GRAKE receiver is provided in the following article:

S. J. Grant et al. "Generalized RAKE Receivers for MIMO Systems" in Proc. VTC'03-Fall, Orlando, Fla., October 2003.

Although the MMSE-GRAKE receiver works well in frequency selective fading, it underperforms severely in lightly dispersive or nearly flat scenarios. As such, the Joint-Detection (JD)-Generalized RAKE receiver (JD-GRAKE receiver) was recently developed to restore performance in such cases, and also is described by Grant et al. in the above referenced article. The JD-GRAKE receiver can also be used in MIMO configurations where the number of receive antennas is less than the number of transmit antennas. In these cases, the JD-GRAKE receiver outperforms the MMSE-GRAKE receiver in all levels of dispersion.

The JD-GRAKE receiver is able to handle the various types of interference by forming a partition of signals reminiscent of group detection for CDMA. Specifically, subsets of signals that share the same channelization code are formed and joint detection is applied to the M signals within each subset, where M is the number of transmitting antennas at the base station. This resolves the interference due to code reuse. The ISI and MAI from signals outside each subset are suppressed in a similar fashion as in the conventional single-antenna GRAKE receiver. That is, the ISI and MAI are treated as colored Gaussian noise and the correlation of the interference across fingers on multiple receive antennas is exploited in adapting the finger delays and combining weights. This detection procedure is performed separately for each of the K channelization codes.

A problem with the JD-GRAKE receiver, however, is that when higher-order modulation is used in conjunction with a large number of transmit antennas, the number of metrics to compute in forming the soft bit values required by a decoder becomes very large. Specifically, with M transmit antennas and a signal constellation containing Q points, the number of metrics to compute per symbol period is $Q^M$. For example, with 16-QAM (Q=16) and M=4 transmit antennas, the number of metrics is 65,536—a large number indeed. One way to address this problem and avoid the exponential complexity in the JD-GRAKE receiver is to use a receiver based on successive cancellation as described in U.S. patent application Ser. No. 10/795,101 entitled "Successive Interference Cancellation in a Generalized RAKE Receiver Architecture" and filed on May 5, 2004, which is incorporated by reference herein. The exponential complexity is avoided in the successive cancellation receiver by successively detecting the M transmitted signals in a multi-stage approach. The present invention, meanwhile, addresses complexity growth by introducing a technique that significantly reduces the number of metric computations of the JD-GRAKE receiver, allowing near-optimal joint detection to be performed in a single stage.

BRIEF DESCRIPTION OF THE INVENTION

The present invention includes a technique for reducing the number of metric computations that need to be performed by a JD-GRAKE receiver by reformulating a metric so it is cumulative over the transmit antennas which in turn enables a tree search technique with a reduced complexity, for example, the m-algorithm, to be used to compute soft bit values that are then processed to determine the coded bits received from the transmit antennas. The resulting reduced complexity JD-GRAKE receiver is referred to herein as the RC-JD-GRAKE receiver.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE INVENTION

Discussing and illustrating details in the exemplary embodiments of the present invention necessarily involves a certain level of complexity. Such complexities are explored in the exemplary details given later herein but an initial understanding of the present invention's broader aspects may be gained with reference to the relatively simple diagram given in FIG. 1. However, before discussing FIG. 1, it should be understood that the present invention broadly involves the application of GRAKE-based signal detection in combination with joint detection techniques.

As used herein the term "GRAKE" connotes a RAKE combining circuit and/or combining method that calculates impairment correlations between the streams of despread values being RAKE combined by the circuit. Such impairments arise, for example, because of MAI (multiple access interference), aggressive spreading code reuse, channel fading conditions, etc. Note that own-cell MAI may be accounted for as interference, while other-cell MAI may be treated as noise and/or interference. Regardless, as will be explained later herein, however, GRAKE processing as used in the present invention is adapted for joint detection processing, and, as noted, generating soft bit values to be passed to a decoder through reduced complexity tree search techniques.

Figure 1:
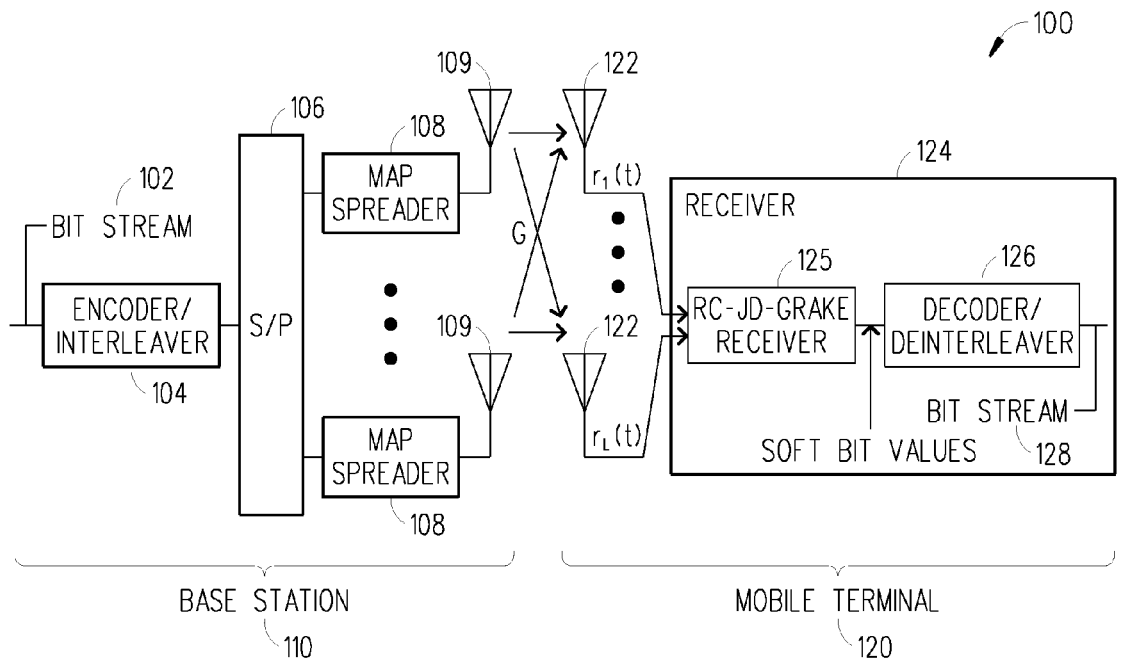
FIG. 1 is a block diagram of a MIMO wireless communications network that includes a base station and a mobile terminal that incorporates a RC-JD-GRAKE receiver in accordance with the present invention.

Referring to FIG. 1, one sees an exemplary MIMO wireless communications network 100 that includes a base station 110 and a mobile terminal 120 that incorporates a RC-JD-GRAKE receiver 125 configured in accordance with the present invention. It should be noted that many components and details associated with the base station 110 and the mobile terminal 120 described herein are well known in the industry. Therefore, for clarity, the description provided below omits those well-known components and details that are not necessary to understand the present invention.

At the base station 110, an information bit stream 102 is first coded and interleaved by an encoder/interleaver 104. The coded bits are spatially demultiplexed by a spatial demultiplexer 106 and multiple map spreaders 108 and then distributed to multiple transmit antennas 109. In particular, the spatial demultiplexer 106 and multiple map spreaders 108 process the bit stream 102 such that the coded bits (data streams) on each transmit antenna 109 are mapped to K modulation symbols and each symbol is spread using one of the K channelization codes according to the WCDMA scheme. It should be noted that different data streams are transmitted from each transmit antenna 109. It should also be noted that the aforementioned spatial demultiplexing approach could be replaced by using more than one encoder/interleaver, possibly with different coding rates, and assigning the resulting coded bit streams to one or more transmit antennas. The modulated and spread coded bits at each transmit antenna 109 are then converted to RF signals and transmitted to the mobile terminal 120 over a spatial channel represented by the term G. The channel G represents the medium response from each transmit antenna 109 to each receive antenna 122 in the mobile terminal 120, and may be dispersive and time-varying. For simplicity, a static, fixed in time, channel which is dispersive is considered herein.

At the mobile terminal 120, the received composite signal comprised of the received signals $r_1(t)$ through $r_L(t)$ at the L receive antennas 122 are processed by a receiver 124 which includes the RC-JD-GRAKE receiver 125 and a decoder/deinterleaver 126. The RC-JD-GRAKE receiver 125 processes the received signals and outputs soft bit values which are representative of the coded bits. The decoder/deinterleaver 126 then processes the soft bit values and outputs a bit stream 128 which is representative of the bit stream 102 at the base station 110. A more detailed discussion about the different components of the RC-JD-GRAKE receiver 125 and how those components function to generate the soft bit values using the technique of the present invention is provided below with respect to FIG. 2.

Figure 2:
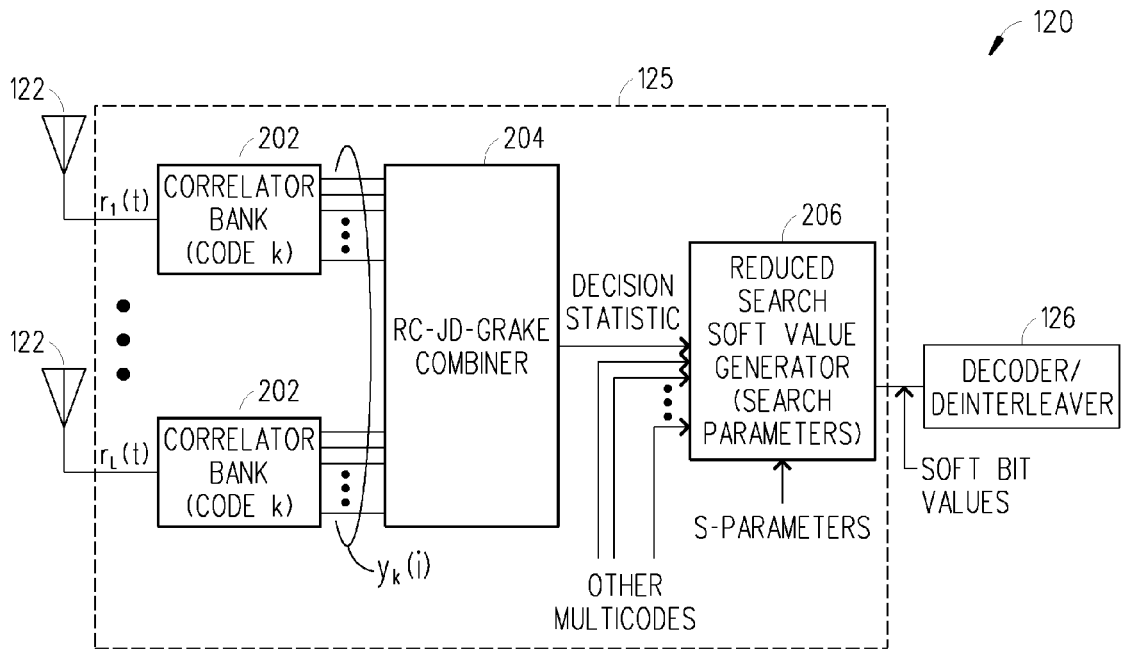
FIG. 2 is a block diagram illustrating in greater detail the structure of the RC-JD-GRAKE receiver shown in FIG. 1.

Referring to FIG. 2, there is a block diagram illustrating in greater detail the structure of the RC-JD-GRAKE receiver 125 for the kth multi-code. The first stage of the RC-JD-GRAKE receiver 125 includes a number of correlator banks 202, each including a plurality of correlators (or "fingers") tuned to the kth multi-code, where the total number of correlators across all of the receive antennas 122 is N. Each correlator bank 202 on each receive antenna contains several correlators (fingers), and the actual number of correlators is typically greater than the number of channel taps. It should be noted that when code-reuse MIMO is applied to HSDPA, K multi-codes are transmitted on each of the M transmit antennas 109, and the same codes are reused on all transmit antennas 109. The outputs of the correlators are sampled at times t=iT where T is the symbol period. The despread values are grouped into the length-N vector $y_k(i)$ (see FIG. 2) where the qth element corresponds to the finger with delay $T_q$ and is given by:

$$\{y_k(i)\}_q = \qquad \qquad (1A)$$

$$\sqrt{\frac{E_T}{NM}} \sum_{m=1}^{M} \sum_{n=1}^{K} \sum_{\substack{j=-\infty \\ n \neq 0}}^{\infty} c_{nm}(i-j) \sum_{p=1}^{P} g_{lmp} r_{knij}(jT + \tau_q - \tau_{lmp}) + n_{lki}(\tau_q)$$

Here $E_T$ is the total transmit energy per symbol that is divided evenly amongst multi-codes and transmit antennas 109. The function $r_{knij}(T)$ is the cross-correlation function between the spreading waveform $u_{ki}(t)$ during the ith symbol period and the spreading waveform $u_{n,i-j}(t)$ during the (i-j)th symbol period. The waveform correlation varies from symbol-to-symbol due to longcode scrambling, hence the subscript 'i'. The noise component of the correlator output is given by $n_{lki}(\tau)=\int_{-\infty}^{\infty} n_l(t) u_{ki}^*(t-iT-\tau)dt$. Although not denoted explicitly, the receive antenna index l is a function of the finger index q since the fingers span multiple receive antennas 122. The delay $T_{lmp}$ and complex gain coefficient $g_{lmp}$ describe the pth tap of the P-tap channel impulse response between the mth transmit antenna 109 and lth receive antenna 122. A more useful form for the despread vector $y_k(i)$ is:

$$y_k(i)=Hc_k(i)+x_k(i). \quad (1B)$$

The transmit symbol vector $c_k(i)=[c_{1k}(i)\ c_{2k}(i)\ \ldots\ c_{Mk}(i)]^T$ contains the M symbols during the ith symbol period that share the kth multi-code. The N×M gain matrix $H=[h_1\ h_2\ \ldots\ h_M]$ describes the MIMO channel in full, where each gain vector $h_m$ describes the channel between the mth transmit antenna 109 and the fingers of the multiple receive antennas 122. The vector $x_k(i)$ describes the impairment process consisting of ISI, MAI, and noise, i.e., that portion of the despread vector $y_k(i)$ not related to $c_k(i)$. The impairment covariance matrix, which captures the correlation of the interference across both fingers and multiple receive antennas, is denoted $R_x=E[x_k(i)x_k^\dagger(i)]$. Grant, et al., provides a more detailed discussion about the expressions H and $R_x$ in the appendix of the previously referenced article entitled "Generalized RAKE Receivers for MIMO Systems."

Like the JD-GRAKE receiver described by S. J. Grant, et al., the operation of the RC-JD-GRAKE receiver 125 is based on the joint detection of the M symbols in the vector $c_k(i)$ which assumes knowledge of the probability density function (PDF) of the despread vector $y_k(i)$ conditioned on the hypothesized symbol vector c and the gain matrix H. For example, the gain matrix H can be estimated using the despread values from pilot channels transmitted on each antenna 109. Further assuming the impairment vector is Gaussian, the required PDF is then proportional to $\exp[\lambda_k(c)]$ where $\lambda_k(c)$ is the metric for hypothesis c. After dropping hypothesis independent terms, the detection metric is given by $$\lambda_k(c)=2\,Re[c^\dagger z_k(i)]-c^\dagger Sc. \quad (2)$$

The decision statistic $z_k(i)$ is generated and output by the combiner 204 by weighting the despread vector $y_k(i)$ as $$z_k(i)=W^\dagger y_k(i), \quad (3)$$

where the GRAKE weight matrix is given by $$W=R_x^{-1}H. \quad (4)$$

The M×M matrix, referred to herein as the s-parameter matrix and denoted the matrix symbol S, is given by $$S=H^\dagger R_x^{-1} H, \quad (5)$$

and represents the mixing between symbols in the detection metric described by equation no. 2. The s-parameter matrix is the product of the combining weights and the channel gain matrix, and is analogous to the s-parameters in MLSE-type equalizers.

As described in the article by Grant, et al., a traditional JD-GRAKE receiver uses an exhaustive tree search to calculate the metric $\lambda_k(c)$ for all $Q^M$ symbol vector hypotheses. Again, the number of calculations that need to be performed by the traditional JD-GRAKE receiver can be extremely large. For example, with 16-QAM (Q=16) and M=4 transmit antennas, the number of $\lambda_k(c)$ metrics that need to be calculated is 65,536—a large number indeed.

The RC-JD-GRAKE receiver 125 of the present invention addresses the computational complexity problem of the JD-GRAKE receiver by using a technique that significantly reduces the number of metrics that need to be computed. The RC-JD-GRAKE receiver 125 reduces this complexity by casting the metric $\lambda_k(c)$ into a special form (see equation no. 10) that allows a non-exhaustive tree search technique to be used to calculate fewer metrics $\lambda_k(c)$. In this embodiment, the m-algorithm is used to reduce the complexity of the tree search. In particular, the key to reducing this complexity through the m-algorithm is to re-write the metric $\lambda_k(c)$ shown in equation no. 2 into a form that is cumulative over the transmit antennas 109.

To this end, consider the metric described by equation no. 2. Since $\lambda_k(c)$ is the metric used to detect c, a term that does not include c can be added to $\lambda_k(c)$ as this does not affect the detection process. Thus, a term is added to "complete the squares" resulting in the following new metric $$\lambda_k(c)=-c^\dagger Sc+2Re[c^\dagger SS^{-1}z_k(i)]-z_k^\dagger(i)S^{-1}SS^{-1}z_k(i). \quad (6)$$

Equation no. 6 can be factored into the following form $$\lambda_k(c)=-(c-S^{-1}z_k(i))^\dagger S(c-S^{-1}z_k(i)). \quad (7)$$

Letting $$\check{c}_k(i)=S^{-1}z_k(i), \quad (8)$$

equation no. 7 can be rewritten as $$\lambda_k(c)=[c-\check{c}_k(i)]^H S[c-\check{c}_k(i)]. \quad (9)$$

Note the term $\check{c}_k(i)$ is a first symbol estimate of the transmitted symbol vector c. The form of first symbol estimate $\check{c}_k(i)$ is similar to the estimate obtained from the zero-forcing block linear equalizer described in "Zero Forcing and Minimum Mean-Square-Error Equalization for Code-Division Multiple-Access Channels," by Anja Klein et al., published in the IEEE Transactions on Vehicular Technology, vol. 45, no. 2, May, 1996, pp. 276-287. The contents of this article are incorporated by reference herein.

The final step in rewriting the metric is to perform a decomposition of the s-parameter matrix so that the metric in equation no. 9 can be expressed as a sum of branch metrics that is causal over the set of transmit antennas. To this end, the Cholesky decomposition of the s-parameter matrix is performed, resulting in the factorization of the s-parameter matrix S into the product of another matrix and it's Hermitian transpose. The matrix representing this factorization, herein referred to as the causal factorization of the s-parameter matrix, and denoted by the matrix symbol $L_S$, is a M×M lower triangular matrix with the (m,n)th element denoted $l_{mn}$. This factorization is represented as $S=L_S^\dagger L_S$.

Because $L_S$ is lower triangular, $l_{mn}$ is nonzero only when $n \leq m$. This allows the metric in equation no. 9 to be expressed as $\lambda_k(c)=-\|L_S[c-\check{c}_k(i)]\|^2$. Alternatively, equation no. 9 is written as $$\lambda_k(c) = -\sum_{m=1}^{M} \lambda_{km}(c), \quad (10)$$

and the left hand side of equation no. 10 is referred to herein as the cumulative metric. The terms within the summation on the right hand side, referred to herein as the branch metrics, are denoted as $\lambda_{km}(c)$, and are given by $$\lambda_{km}(c) = \left| \sum_{n=1}^{m} l_{mn}(c_n - \check{c}_{kn}(i)) \right|^2. \quad (11)$$

The symbols $c_n$ and $\check{c}_{kn}(i)$ are the nth elements of the length-M hypothesis c and the first symbol estimate $\check{c}_k(i)$, respectively. As can be seen, the metric in equation no. 10 is cumulative over transmit antennas 109. Furthermore, each branch metric $\lambda_{km}(c)$ is strictly positive and depends only on the symbol hypotheses for the current and previous antennas 109. This fact allows the number of metric computations to be greatly reduced by use of a tree search technique like the m-algorithm.

It should be appreciated that there are two reasons for performing the Cholesky decomposition on S to create equation no. 10. The first is so that the metric in equation no. 9 can be written as the squared norm of the vector $L_S[c-\check{c}_k(i)]$. The reason the squared norm of this vector is desired is so that the branch metric $\lambda_{km}(c)$ is strictly positive. The second reason is that the Cholesky factor $L_S$ is lower triangular, thus when the squared norm $\|L_S[c-\check{c}_k(i)]\|^2$ (i.e., the result in equation nos. 10-11) is multiplied out it is found that the branch metric $\lambda_{km}(c)$ depends only on the symbols from the current and previous transmit antennas 109. In this manner the cumulative metric $\lambda_k(c)$ is causal across transmit antennas. It should be appreciated to those skilled in the art that there may be other possible factorizations of the s-parameter matrix that result in a causal form of the cumulative metric $\lambda_k(c)$.

Figure 3:
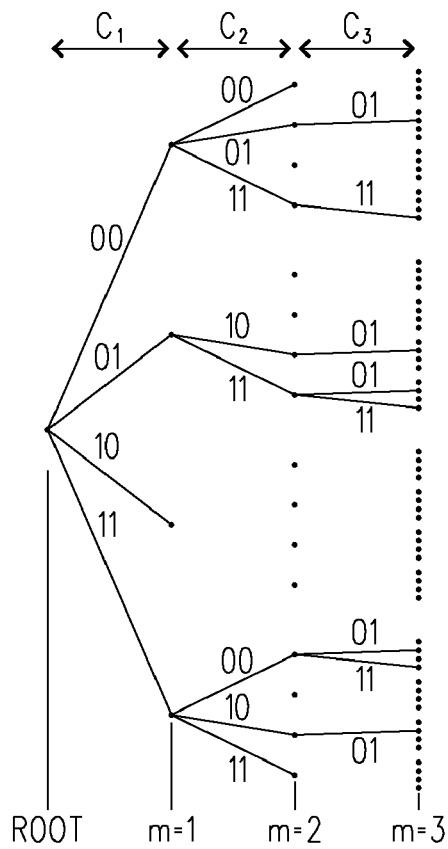
FIG. 3 is an exemplary tree generated by the RC-JD-GRAKE receiver shown in FIG. 2 that illustrates eight retained branches for the case of quadrature phase shift keying (QPSK) (Q=4) and M=3 transmit antennas.

The m-algorithm operates on a tree with stages corresponding to transmit antennas 109. FIG. 3 shows an example for QPSK and three transmit antennas 109 where only the eight best cumulative metrics are retained. Of course, for the first stage where there are fewer than eight nodes in the tree, all of the cumulative metrics are retained. For a more detailed description about the m-algorithm, reference can be made to the article by Y. L. C. de Jong et al. "Iterative Tree Search Detection for MIMO Wireless Systems" in Proc. VTC'02-Fall, Vancouver, Canada, September 2002. The contents of this article are incorporated by reference herein.

After GRAKE combining, the soft value generator 206 calculates the soft bit values that are needed by the decoder 126 through use of the m-algorithm. As can be seen below, the soft value for the rth bit of the mth symbol of the vector $c_k(i)$ (denoted $b_{mkr}(i)$) is denoted by $\Lambda_{mkr}(i)$. To calculate this it is necessary to define the subsets $C_{mr1}$ and $C_{mr0}$ as those which contain the hypotheses for which $b_{mkr}(i)=1$ and 0, respectively. The size of each of these subsets is $Q^M/2$. Further, $F_k$ is defined as the set that contains the candidate symbol vectors corresponding to the remaining branches after the m-algorithm completes. The intersection of this set and the subsets $C_{mr1}$ and $C_{mr0}$, respectively, contains all those symbol vector hypotheses for which the bit of interest $b_{mkr}(i)$ is equal to 1 or 0. Using the standard max-log-MAP approximation, it follows that the soft value for bit $b_{mkr}(i)$ is given by $$\Lambda_{mkr}(i) = \max_{c \in F_k \cap C_{mr1}} \{\lambda_k(c)\} - \max_{c \in F_k \cap C_{mr0}} \{\lambda_k(c)\}, \quad (12)$$

where the metric $\lambda_k(c)$ to use is the one in equation no. 10.

It can happen that the intersection of $F_k$ with either $C_{mr1}$ or $C_{mr0}$ (but not both) is an empty set. Typically, this happens when the number of retained branches in the tree is small. The physical meaning of this situation is that either a one or zero for bit $b_{mkr}(i)$ is unlikely. FIG. 3 shows an example of this situation for the second bit of symbol hypothesis $c_3$ (final stage of tree). In this position, all of the retained branches have a bit value of 1, meaning that bit value 1 is most likely. In such situations, the soft value $\Lambda_{mkr}(i)$ can be set to a positive constant. Conversely, if all retained branches have a bit value of zero in a given position, then $\Lambda_{mkr}(i)$ can be set to a negative constant indicating that a zero is most likely.

Figure 4:
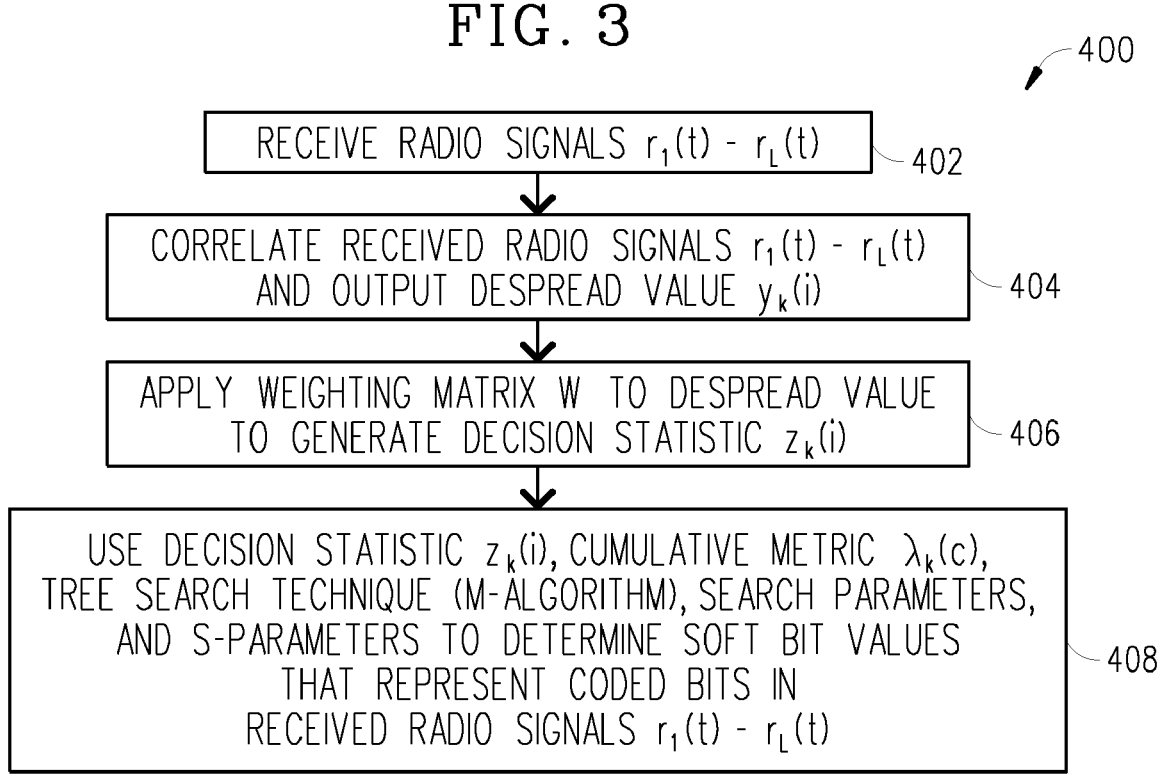
FIG. 4 is a flowchart illustrating the steps of the preferred method for reducing the complexity of processing signals that are received at the mobile terminal by using the RC-JD-GRAKE receiver shown in FIG. 2 in accordance with the present invention.

A detailed description is provided next to summarize the operation 400 of the mobile terminal 120 in accordance with the present invention (see FIG. 4). At the mobile terminal 120, the signals $r_1(t)$ through $r_L(t)$ are received (step 402 in FIG. 4) at the receive antennas 122 and processed by the correlators. For channelization code k, each received signal $r_1(t)$ through $r_L(t)$ is separately correlated (step 404 in FIG. 4) by one of the correlators at different Rake finger delays. The output of the correlators is the despread value $y_k(i)$ which is described by equation no. 1B. It should be noted that the channel is now represented by the matrix H, which includes samples of the medium response G, as well as the contribution from the transmit and receive filter pulse-shape (see FIG. 1). The despread values $y_k(i)$ for code k are then processed by the JD-GRAKE combiner 204 which applies (step 406 in FIG. 4) a weighting matrix W, to the despread values $y_k(i)$ according to equation no. 3. This has the effect of canceling at least a portion of the MAI, ISI and other antenna interference from the despread values $y_k(i)$ for the signal from each transmitted antenna 109. The output of the combiner 204 is the decision statistic $z_k(i)$.

The reduced search soft value generator 206 then determines the soft bit values that represent the coded bits of the received signals $r_1(t)$ through $r_L(t)$ using a reduced tree search technique, such as the m-algorithm, and the decision metric $\lambda_k(c)$ of equation no. 10 (see step 408 in FIG. 4). Inputs to the reduced search soft value generator 206 are the decision statistics $z_k(i)$, the s-parameter matrix S, and search parameters that govern the search technique.

Figure 5:
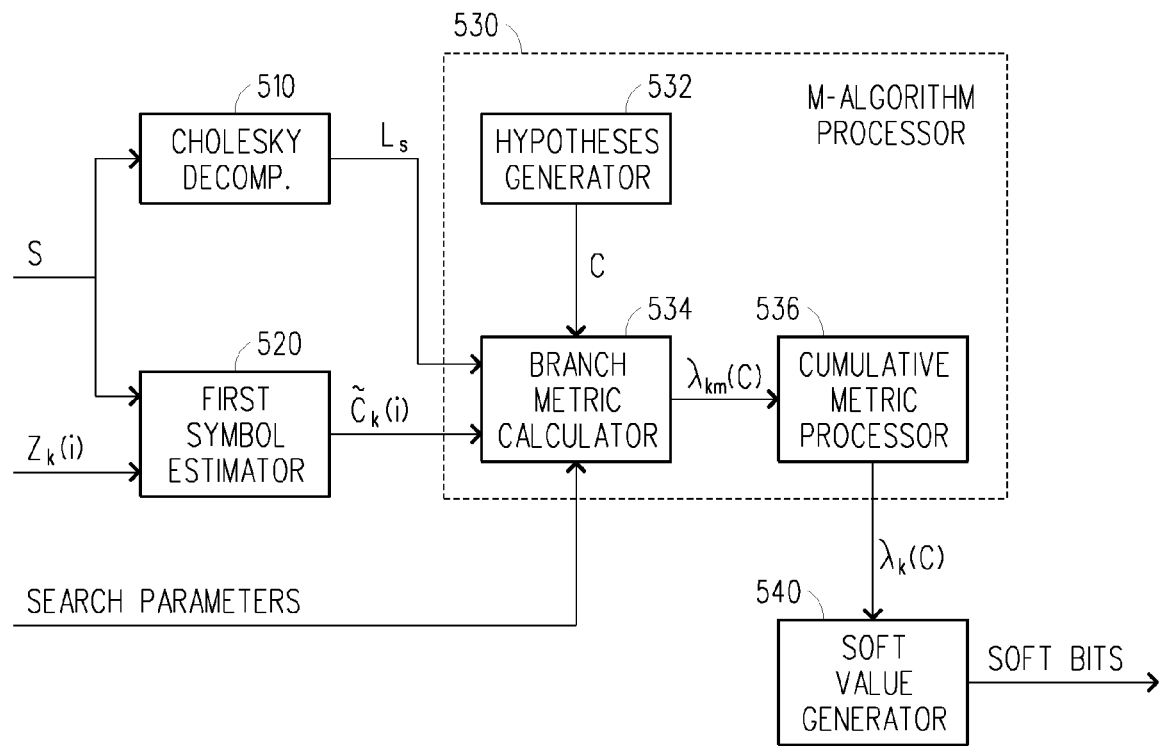
FIG. 5 is a block diagram illustrating in greater detail the components in one embodiment of a reduced search soft value generator used in the RC-JD-GRAKE receiver shown in FIG. 2 in accordance with the present invention.

FIG. 5 is a block diagram illustrating in greater detail the components in one embodiment of the reduced search soft value generator 206. As shown, the s-parameter matrix S is input to block 510 and which performs the Cholesky decomposition on S and outputs the result $L_S$ to the m-algorithm processor 530. The first symbol estimator 520 computes first symbol estimates $\check{c}_k(i)$, which is input to the m-algorithm processor 530. Search parameters, such as the number of hypotheses P to retain, are also input to the m-algorithm processor 530, which computes the total cumulative metric $\lambda_k(c)$ based on equation no. 10.

Within the m-algorithm processor 530 are the hypotheses generator 532 that generates hypotheses c that are input to the branch metric calculator 534. The branch metric calculator 534 computes the branch metrics $\lambda_{km}(c)$ according to equation no. 11, using the hypotheses c, the elements of $L_S$, and the first symbol estimates $\check{c}_k(i)$. The branch metrics are output to the cumulative metric processor 536, which determines for the mth step, according to equation no. 10, which of the P cumulative metrics to retain. Typically, the cumulative metrics are sorted and the best P of these values are stored and used later in the (m+1)st step. After the final (Mth) step, the best P cumulative metrics are output from the m-algorithm processor 530 to the soft value generator 540.

The soft value generator 540 computes soft values according to equation no. 12 and outputs the soft bit values to the decoder 126. The decoder 126 then processes the soft bit values and outputs the bit stream 128 which is representative of the bit stream 102 in the base station 110 (see FIG. 1).

As can be seen, the technique of the present invention effectively reduces the number of metric computations that need to be performed by the RC-JD-GRAKE receiver 125. To demonstrate this improved performance, an estimate of the complexity per symbol period per multi-code is given as follows. First, denote P as the m-algorithm parameter, i.e., the maximum number of retained branches in the tree. At stage $m \in \{1,2,\ldots,M\}$, $QL_m$ branch metrics are computed where $L_m = \min(Q^{m-1}, P)$. The min function accounts for the fact that during the first few stages, the number of nodes in the tree may be less than P. The $QL_m$ computed branch metrics are then added to the $L_m$ maximum cumulative metrics retained from the previous stage. The resulting cumulative metrics are then sorted and only the largest $L_{m+1}$ are retained for the next stage. With M stages, the total number of branch metric computations is upper bounded by MQP. The upper bound assumes that during the first few stages, $L_m = P$. Clearly the number of metric computations is linear in M compared to the exponential dependence for an exhaustive search.

Table 1 shows the actual complexity (rather than upper bound) for various combinations of M and P for 16-QAM (Q=16). The complexity is expressed as a percentage reduction in the number of branch metric computations compared to the full complexity traditional JD-GRAKE receiver, which computes $Q^m$ metrics at each stage. Evidently, for 1 and 2 antennas, there is no reduction in complexity for the parameter settings considered. With a larger number of antennas (3 or 4), a significant reduction may be obtained. As can be seen, by retaining only 32 branches, a striking 98% reduction in complexity may be obtained. Moreover, this reduction comes at little cost to performance compared to full complexity traditional JD-GRAKE receiver, and still results in performance better than a traditional MMSE-GRAKE receiver. While the complexity saving is partially offset by the sorting operations required by the m-algorithm, the overall complexity reduction is still significant.

TABLE 1

| | P | | | |
|---|---|---|---|---|
| M | 16 | 32 | 64 | 128 |
| 1 | 0 | 0 | 0 | 0 |
| 2 | 0 | 0 | 0 | 0 |
| 3 | 87.9 | 82.0 | 70.3 | 46.9 |
| 4 | 98.9 | 98.1 | 96.7 | 93.8 |

Additional embodiments of the present invention are described in detail below:

While the preferred embodiment described above employs the m-algorithm, another embodiment could adopt list sphere decoding (LSD) instead to reduce the complexity of the JD-GRAKE tree search. List sphere decoding is described, for example, by the article titled "Soft-input, soft-output lattice sphere decoder for linear channels," by J. Boutros et al. in the IEEE Global Telecommunications Conf., December 2003, pp. 1583-87, and is incorporated by reference herein. It is believed that with LSD, a similar reduction in complexity could be obtained, with minimal impact on performance. Also, it should be noted that the LSD approach is designed primarily for flat-fading, whereas the preferred JD-GRAKE receiver 125 is designed for the dispersive propagation seen in practical systems.

At each stage of the tree search, it may be possible to exploit the structure of Cholesky decomposition to predict which branch metrics $\lambda_{km}(c)$ contribute little to the cumulative metric $\lambda_k(c)$. These branches $\lambda_{km}(c)$ could then be discarded to lower the sorting load and thus further reduce the complexity of the tree search.

From the foregoing, it can be readily appreciated that an important aspect for being able to use the m-algorithm for the RC-JD-GRAKE tree search is to reformulate the receiver metric so it is cumulative over transmit antennas. This is done using a two-step process. The first step involves finding the first symbol estimate of the transmit symbol vector which involves a matrix transformation of the decision statistic at the output of the RC-JD-GRAKE receiver. The second step involves a Cholesky decomposition of the s-parameter matrix, i.e., the product of the channel gain matrix and the RC-JD-GRAKE combining weight matrix. Since the Cholesky factor is lower triangular, each term of the cumulative metric depends on the symbol hypothesis for the current and previous antennas only. This fact allows the tree to be searched sequentially starting from its root and keeping only a limited number of branches based on the best metrics at each node. When the tree search is complete, a soft value for each constituent bit of the transmit symbol vector is calculated using the metrics of the most likely hypotheses.

Several merits of the invention include the following:

Large reduction in receiver complexity. For example, with 4 transmit antennas and 16-QAM modulation where the number of branches in the tree is 65,536, the number of retained branches may be as few as 32 while still achieving performance very close to the full tree search. This is a striking 98% reduction in metric computations. While this reduction is partially offset by the sorting operations required by the m-algorithm, the overall complexity reduction is still significant.

The large reduction in complexity results in very little degradation in performance. Using the above example where only 32 branches are retained, the degradation compared to the full tree search is approximately 0.33 dB.

The reduction in complexity of the RC-JD-GRAKE demodulator opens the door for iterative demodulation/decoding approaches. Since the complexity of the demodulation step is kept to a minimum, the overall complexity when several iterations are performed becomes manageable.

Although several embodiments of the present invention has been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A method of processing a received composite communications signal that includes two or more signals of interest, the method comprising the steps of:
   generating combining weights as a function of impairment correlations for despread values of the input signals;
   combining the despread values according to the combining weights; and,
   jointly detecting the signals of interest based on the combined despread values and mixing between symbols in a detection metric;
   wherein said step of jointly detecting the signals of interest further comprises jointly demodulating the combined despread values to obtain soft values representing estimates of detected bits in the signals of interest;

wherein said step of jointly demodulating the combined despread values to obtain soft values representing estimates of detected bits in the signals of interest further comprises generating soft values by a non-exhaustive tree search technique;

wherein said step of generating soft values by a non-exhaustive tree search technique further comprises the steps of:

generating a causal factorization of a s-parameter matrix;

generating first symbol estimates of a transmitted symbol vector;

generating a reduced set of cumulative metrics based on the causal factorization of the s-parameter matrix and first symbol estimates of the transmitted symbol vector by producing a set of cumulative metrics using an m-algorithm processor; and generating soft bit values based on the set of cumulative metrics produced by the m-algorithm processor.

2. The method of claim 1, further comprising providing the soft values to a decoder circuit, and decoding the soft values to obtain detected bits for each signal of interest.

3. The method of claim 1, wherein said step of jointly demodulating the combined despread values to obtain soft values representing estimates of detected bits in the signals of interest further comprises generating soft values by a list sphere decoder.

4. The method of claim 1, wherein said step of generating soft values by a non-exhaustive tree search technique further comprises generating soft value by an m-algorithm.

5. The method of claim 1, wherein said step of generating soft values by a non-exhaustive tree search technique further comprises generating detection metrics that are cumulative over transmit antennas.

6. The method of claim 1, wherein producing a set of cumulative metrics by an m-algorithm processor comprises:

generating a complete set of branch hypotheses;

computing a complete set of branch metrics based on the complete set of branch hypotheses;

computing cumulative metrics based on the complete set of branch hypotheses;

selecting the set of cumulative metrics; and outputting the set of cumulative metrics.

7. The method of claim 1, wherein the signals of interest share the same channelization or spreading code.

8. The method of claim 1, wherein the signals of interest are representative of signals transmitted by different transmitting antennas.

9. The method of claim 1, wherein the signals of interest are a subset of a larger set of signals, and wherein interference resulting from those signals in the larger set that are not the signals of interest is canceled by the combining weights.

10. A receiver for processing a received composite communications signal that includes two or more signals of interest, said receiver comprising:

a plurality of correlator banks and a combiner for a generating combining weights as a function of impairment correlations for despread values of the input signals and for combining the despread values according to the combining weights; and a reduced search soft value generator for jointly detecting the signals of interest based on the combined despread values and mixing between symbols in a detection metric;

wherein said reduced search soft value generator jointly detects the signals of interest by jointly demodulating the combined despread values to obtain soft values representing estimates of detected bits in the signals of interest; and, wherein said reduced search soft value generator uses a non-exhaustive tree search technique to generate the soft values by performing the following steps:

generating a causal factorization of a s-parameter matrix;

generating first symbol estimates of a transmitted symbol vector;

generating a reduced set of cumulative metrics based on the causal factorization of the s-parameter matrix and first symbol estimates of the transmitted symbol vector by producing a set of cumulative metrics using an m-algorithm processor; and generating soft bit values based on the set of cumulative metrics produced by the m-algorithm processor.

11. The receiver of claim 10, further comprising a decoder circuit that receives the soft values and decodes the soft values to obtain detected bits for each signal of interest.

12. The receiver of claim 10, wherein said reduced search soft value generator uses a list sphere decoder to generate the soft values.

13. The receiver of claim 10, wherein said reduced search soft value generator uses a non-exhaustive tree search technique which implements an m-algorithm to generate the soft values.

14. The receiver of claim 10, wherein said reduced search soft value generator uses a non-exhaustive tree search technique to generate detection metrics that are cumulative over transmit antennas.

15. The receiver of claim 10, wherein said m-algorithm processor produces the set of cumulative metrics by performing the following steps:

generating a complete set of branch hypotheses;

computing a complete set of branch metrics based on the complete set of branch hypotheses;

computing cumulative metrics based on the complete set of branch hypotheses;

selecting the set of cumulative metrics; and outputting the set of cumulative metrics.

16. The receiver of claim 10, wherein the signals of interest share the same channelization or spreading code.

17. The receiver of claim 10, wherein the signals of interest are representative of signals transmitted by different transmitting antennas.

18. The receiver of claim 10, wherein the signals of interest are a subset of a larger set of signals, and wherein interference resulting from those signals in the larger set that are not the signals of interest is canceled by the combining weights.

19. A wireless communication system, comprising:

a base station for transmitting a composite communications signal;

a mobile terminal for receiving and processing the composite communications signal that includes two or more signals of interest by performing the following steps:

generating combining weights as a function of impairment correlations for despread values of the input signals;

combining the despread values according to the combining weights; and, jointly detecting the signals of interest based on the combined despread values and mixing between symbols in a detection metric, wherein said step of jointly detecting the signals of interest further comprises jointly demodulating the combined despread values to obtain soft values representing estimates of detected bits in the signals of interest;

wherein said step of jointly demodulating the combined despread values to obtain soft values representing estimates of detected bits in the signals of interest comprises generating soft values by a non-exhaustive tree search technique;

wherein said step of generating soft values by a non-exhaustive tree search technique comprises the steps of:

generating a causal factorization of a s-parameter matrix;

generating first symbol estimates of a transmitted symbol vector;

generating a reduced set of cumulative metrics based on the causal factorization of the s-parameter matrix and first symbol estimates of the transmitted symbol vector by producing a set of cumulative metrics using an m-algorithm processor; and, generating soft bit values based on the set of cumulative metrics produced by the m-algorithm processor.

20. The wireless communication system of claim 19, wherein said mobile terminal uses a list sphere decoder to generate the soft values.

21. A mobile terminal comprising:

a plurality of receive antennas for receiving a composite communications signal; and a receiver including:

a plurality of correlator banks and a combiner for a generating combining weights as a function of impairment correlations for despread values of the input signals and for combining the despread values according to the combining weights; and a reduced search soft value generator for jointly detecting the signals of interest based on the combined despread values and mixing between symbols in a detection metric, wherein said reduced search soft value generator jointly detects the signals of interest by jointly demodulating the combined despread values to obtain soft values representing estimates of detected bits in the signals of interest; and, wherein said reduced search soft value generator uses a non-exhaustive tree search technique to generate the soft values by performing the following steps:

generating a causal factorization of a s-parameter matrix;

generating first symbol estimates of a transmitted symbol vector;

generating a reduced set of cumulative metrics based on the causal factorization of the s-parameter matrix and first symbol estimates of the transmitted symbol vector by producing a set of cumulative metrics using an m-algorithm processor; and generating soft bit values based on the set of cumulative metrics produced by the m-algorithm processor.

22. The mobile terminal of claim 21, wherein said reduced search soft value generator uses a non-exhaustive tree search technique which implements an m-algorithm to generate the soft values.

23. The mobile terminal of claim 21, wherein said reduced search soft value generator uses a non-exhaustive tree search technique to generate detection metrics that are cumulative over transmit antennas.

24. A base station comprising:

a plurality of transmit antennas for transmitting a composite communications signal to a mobile terminal that includes:

a plurality of receive antennas for receiving a composite communications signal; and a receiver including:

a plurality of correlator banks and a combiner for a generating combining weights as a function of impairment correlations for despread values of the input signals and for combining the despread values according to the combining weights; and a reduced search soft value generator for jointly detecting the signals of interest based on the combined despread values and mixing between symbols in a detection metric;

wherein said reduced search soft value generator jointly detects the signals of interest by jointly demodulating the combined despread values to obtain soft values representing estimates of detected bits in the signals of interest; and, wherein said reduced search soft value generator uses a non-exhaustive tree search technique to generate the soft values by performing the following steps:

generating a causal factorization of a s-parameter matrix;

generating first symbol estimates of a transmitted symbol vector;

generating a reduced set of cumulative metrics based on the causal factorization of the s-parameter matrix and first symbol estimates of the transmitted symbol vector by producing a set of cumulative metrics using an m-algorithm processor; and generating soft bit values based on the set of cumulative metrics produced by the m-algorithm processor.

25. The base station of claim 24, wherein said reduced search soft value generator uses a non-exhaustive tree search technique which implements an m-algorithm to generate the soft values.

26. The base station of claim 24, wherein said reduced search soft value generator uses a non-exhaustive tree search technique to generate detection metrics that are cumulative over transmit antennas.

* * * * *